United States Patent
Reid (10) Patent No.: US 10,369,917 B2
(45) Date of Patent: Aug. 6, 2019

(54) TRAILER

(71) Applicant: Reid Inventions Limited, Auckland (NZ)

(72) Inventor: Glen Reid, Auckland (NZ)

(73) Assignee: Reid Inventions Limited, Auckland (NZ)

( * ) Notice: Subject to any disclaimer, the term of this patent is extended or adjusted under 35 U.S.C. 154(b) by 303 days.

(21) Appl. No.: 15/418,358

(22) Filed: Jan. 27, 2017

(65) Prior Publication Data

US 2018/0215302 A1    Aug. 2, 2018

(51) Int. Cl.
| | |
|---|---|
| *B60P 3/06* | (2006.01) |
| *B60P 1/08* | (2006.01) |
| *B62D 63/06* | (2006.01) |
| *B60P 1/14* | (2006.01) |
| *B62D 63/08* | (2006.01) |
| *B60P 1/02* | (2006.01) |
| *H02J 7/35* | (2006.01) |

(52) U.S. Cl.
CPC ................ *B60P 1/08* (2013.01); *B60P 1/025* (2013.01); *B60P 1/14* (2013.01); *B62D 63/061* (2013.01); *B62D 63/08* (2013.01); *H02J 7/35* (2013.01)

(58) Field of Classification Search
CPC ........................................................ B60P 3/06
USPC .................................. 414/481, 482, 476, 484
See application file for complete search history.

(56) References Cited

U.S. PATENT DOCUMENTS

| | | | |
|---|---|---|---|
| 8,172,248 B2 | 5/2012 | Groves | |
| 2006/0045693 A1* | 3/2006 | Elliot | B60P 1/027 414/481 |

FOREIGN PATENT DOCUMENTS

NZ          591000          12/2013

OTHER PUBLICATIONS www.airbaggedtrailers.com.
http://www.nevco.com.au.
www.raceking.com.au.
http://www.trailersauce.com/trailer-plans/ground-loading-trailer/introduction/.
https://www.baxleycompanies.com/Trailers.html.
http://www.motorbronx.com.
http://www.airtow.com/trailer-features/.
http://www.razortrailer.com.
http://www.combiclamp.co.nz/sheep-handling/combi-trailer/.
http://www.lift-a-load.com/lofeatures.html.
http://advancemetalworking.com/drop-deck-trailer/.
Motorbronx Racing MR 500 Cobra trailer product literature.

* cited by examiner

*Primary Examiner* — Saul Rodriguez
*Assistant Examiner* — Willie Berry, Jr.
(74) *Attorney, Agent, or Firm* — Patterson + Sheridan, LLP

(57) ABSTRACT

Improved trailers are disclosed having a lowering system comprising lift arms and swing arms that are operable via a plurality of cables and which allow the improved trailers to be oriented in a raised or lowered position.

20 Claims, 8 Drawing Sheets

TRAILER

BACKGROUND

The following disclosure relates to the field of trailers, such as those that can be pulled by consumer and commercial vehicles.

Trailers have long been used for moving loads, large and small, behind vehicles, such as consumer and commercial vehicles. Generally, trailers have one or more sets of wheels that allow the trailer to roll freely behind a towing vehicle. And like vehicles, the deck or base of a trailer is generally elevated from the ground in order that the trailer has clearance to negotiate obstacles, uneven surfaces, etc.

An issue that arises with trailers, however, is that the deck level needs to have sufficient ground clearance for safe and effective operation in many environments, such as on- and off-road. Consequently, any load that is to be placed on the trailer needs to be first lifted to the level of the trailer deck. For large and/or heavy loads, this can be problematic for an individual user and may require additional (and sometimes heavy) machinery.

A ramp is one solution to the aforementioned problem of getting large and/or heavy loads onto a trailer. For example, one or more ramps may be used to roll large and/or heavy loads, such as an automobile or other vehicle, onto the deck of a trailer. While ramps work well in this manner, their use is not without important compromises. For example, the ramps must usually be transported along with the trailer so that the load may subsequently be unloaded via the ramps. And the need to transport the one or more ramps with the trailer may add significant weight and take up significant space on the trailer, limiting the effective load capacity of the trailer.

Another issue with using a ramp to load a trailer is the angle of the ramp with respect to the ground. For example, where a vehicle with a small ground clearance is to be loaded onto a trailer with a large ground clearance via ramps, those ramps may need significant length in order that the approach angle via the ramps is one the vehicle can negotiate without impediment. Unfortunately, increasing the length of the ramps increases the weight and spatial volume of the ramps, which increases the burden of using and carrying them.

Accordingly, there is a need for trailers that can be loaded more easily without having to carry significant additional equipment, such as ramps, and which can accommodate loads with limited ground clearance.

SUMMARY

In one embodiment, a trailer system comprises: a chassis; a deck connected to the chassis; a winch connected to a winch cable; a pulley assembly connected to the winch cable and further connected to a first lifting cable; a first axle beam connected to the deck and further connected to a first axle hub; and a first lifting assembly, comprising: a first hinged pulley assembly; a first swing arm connected to a first outboard stub axle and further connected to a first inboard stub axle, the first inboard stub axle being further connected to the first axle hub; and a first lift arm connected to the first swing arm by a first hinge, the first lift arm comprising a second hinged pulley assembly connected to the first lift arm, wherein a first end of the first lifting cable is connected to the first hinged pulley assembly, wherein the first lifting cable is configured to raise the trailer deck when the pulley assembly connected to the winch cable is moved in a first direction, and wherein the first lifting cable is configured to lower the trailer deck when the pulley assembly connected to the winch cable is moved in a second direction, opposite the first direction.

In some embodiments, the deck of the trailer system may comprise a level portion and an angled portion. In some embodiments, the angled portion of the deck is angled less than or equal to four degrees below the plane formed by the level portion of the deck.

In some embodiments, the trailer system may comprise a first mount beam connected to the deck and further connected to the first hinged pulley assembly.

In some embodiments, the trailer system may comprise a first fixed pulley assembly connected to the first mount beam, wherein the first lifting cable passes through the first fixed pulley assembly and the first hinged pulley assembly.

In some embodiments, the first lift arm and the first swing arm are located outboard of the deck of the trailer system. In some embodiments, the first lift arm does not extend beyond a front end or a rear end of the deck when the trailer is in a lowered position or when the trailer is in a raised position. In some embodiments, the first swing arm is shorter in length than the first lift arm. In some embodiments, the swing arm is connected to a leaf spring, and the leaf spring is further connected to the lift arm.

In some embodiments, the trailer system may comprise a remote control configured to control the operation of the winch.

In some embodiments, the first inboard stub axle and the first outboard stub axle are substantially coplanar.

In some embodiments, the trailer system may comprise an equipment enclosure connected to the chassis, wherein the winch is mounted within the equipment enclosure. In some embodiments, the equipment enclosure further comprises: a solar panel located on a surface of the equipment enclosure; a battery located within the equipment enclosure; and a charging circuit located within the equipment enclosure and electrically connected between the solar panel and the battery.

In some embodiments, the trailer system may further comprise: a second lifting cable connected to the pulley assembly; a second axle beam connected to the deck and further connected to a second axle hub; a third hinged pulley assembly; and a second lifting assembly, comprising: a second swing arm connected to a second outboard stub axle and further connected to a second inboard stub axle, the second inboard stub axle being further connected to the second axle hub; and a second lift arm connected to the second swing arm by a second hinge, the second lift arm comprising a fourth hinged pulley assembly attached to the second lift arm, wherein a first end of the second lifting cable is connected to the second hinged pulley assembly.

In some embodiments, the trailer system may further comprise: a second mount beam connected to the deck and further connected to the third hinged pulley assembly. In some embodiments, the trailer system may further comprise: a second fixed pulley assembly connected to the second mount beam, wherein the second lifting cable passes through the second fixed pulley assembly and the second hinged pulley assembly.

In another embodiment, a lifting assembly comprises: a control cable connected to a control pulley assembly; a lifting cable connected to the control pulley assembly; a first hinged pulley assembly; a swing arm connected to an outboard stub axle and further connected to an inboard stub axle, the inboard stub axle being further connected to an axle hub; and a lift arm connected to the swing arm by a hinge, the lift arm comprising a second hinged pulley assembly connected to the lift arm, wherein a first end of the lifting cable is connected to the first hinged pulley assembly, and wherein the lifting cable is configured to change the position of the lift arm when the control pulley assembly is moved in a first direction.

In some embodiments, the lifting assembly further comprises: a shock absorbing component connected to the swing arm and further connected to the lift arm. In some embodiments, the shock absorbing component is a leaf spring.

In some embodiments, the lifting assembly further comprises: a fixed pulley assembly, wherein the lifting cable passes through the fixed pulley assembly between the first fixed pulley assembly and the control pulley assembly.

DETAILED DESCRIPTION OF CERTAIN INVENTIVE EMBODIMENTS

Disclosed herein are trailers that improve upon the performance of existing trailer designs.

One performance consideration of a trailer is how much load it can carry. To this end, trailers usually have load ratings, such as a Gross Vehicle Weight Rating (GVWR) or Gross Vehicle Mass (GVM), which refer to the amount of weight the trailer can carry as a load. Because the load rating of a trailer typically accounts for the weight of the trailer itself, the weight of the trailer effectively reduces the load capacity of the trailer, i.e. the weight of the load the trailer can carry. For example, a trailer's structure, such as its chassis, deck, axles, wheels, railing, etc., as well as its accessories, such as its parking jack, lights, tool mounts, tool boxes, integrated or removable ramps, etc., collectively its non-load weight, all reduce the load capacity of the trailer relative to the trailer's load rating. Consequently, it is desirable to reduce the non-load weight of the trailer so the load capacity may be maximized for any given trailer load rating.

Another performance consideration of a trailer is how easy it is to use for its intended purpose—namely moving a load from place to place. For example, if a trailer is meant to carry a vehicle as its load, then how easily the trailer can be loaded and unloaded with the vehicle is important. As discussed above, the need to carry and use special accessories, such as ramps, in order to use a trailer for its intended purpose is an important limitation on the ease of use of the trailer. In particular, because ramps must be able to support the weight of the load being placed on the trailer, such as a vehicle, the ramps themselves are usually large and heavy accessories, which may be unwieldy for a user.

Trailers exist that may be lowered in order to reduce the necessity for ramps and other accessories. However, existing trailers' lowering systems are typically based on airbag, hydraulic, or pneumatic lifting systems. Unfortunately, such systems require substantial additional hardware on the trailer, such as pumps, valves, tanks, air lines, pneumatic lines, hydraulic lines, electronic controllers, etc. The significant increase in hardware and complexity of known lowering systems tends to result in trailers that carry more non-load weight, are difficult to use, need constant maintenance, are prone to mechanical failure, and are very expensive.

Embodiments described herein relate to improved trailers that comprise a lowering system that is compact, simple to use, low maintenance, and reliable. In particular, the lowering system described herein relies on a single electrical device, a winch, to move a compact cabling system that in-turn causes the trailer to raise or lower via lift arms. Because the system is primarily mechanical and has relatively few moving parts, it is easy to use, reliable, and requires little maintenance. Further, the compactness of the systems in both part size and count means that the system is lightweight and relatively inexpensive.

The lowering system described herein enables a loading end of a trailer deck to be lowered to ground level. Because the loading end of the trailer deck can be lowered to ground level, the trailer deck itself may be used as a ramp for loading the trailer, which may in-turn obviate the need for carrying ramps. By eliminating the need for ramps to be used and subsequently carried with the trailer, the trailer is easier to use. For example, a user of an improved trailer described herein may enjoy the benefit of not having to unload, deploy, and then reload ramps for use as with a traditional trailer. Further, the load capacity of the trailer relative to its load rating is beneficially increased as well as the amount of load space available on the trailer because the weight and space of auxiliary ramps are unnecessary. Further, the efficiency of using the trailer may be beneficially increased given the reduction in non-load weight (e.g., better fuel mileage for the vehicle towing the trailer).

Figure 1A:
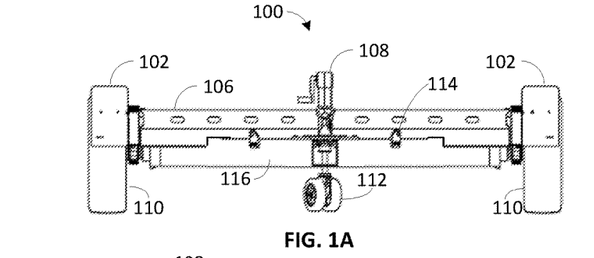
FIGS. 1A-1E depict different plan views of an improved trailer in a raised position.

FIGS. 1A-1E depict different plan views of an improved trailer in a raised position. In particular, FIG. 1A shows a view of trailer 100 down the long axis of trailer 100 and from the front, non-loading end. Trailer 100 comprises a jack assembly 108 connected to a caster wheel 112 (also known as a jockey wheel), which may be used to raise or lower the non-loading end of trailer 100. For example, jack assembly 108 may be used to lower caster wheel 112 to support the front of trailer 100 when trailer 100 is decoupled from a tow vehicle. Conversely, jack assembly 108 may be used to raise caster wheel 112 when trailer 100 is coupled to a tow vehicle and thereby supported by the tow vehicle's hitch.

Trailer 100 also comprises chassis 116, which in this embodiment comprises a plurality of frame elements attached to trailer deck 122. Chassis 116 and trailer deck 122 may be made of any strong and preferably lightweight material, such as a metal or composite material. In some embodiments, one or both of chassis 116 and trailer deck 122 are made from aluminum or an aluminum alloy. In other embodiments, one or both of chassis 116 and trailer deck 122 may be made from a composite material, such as a carbon fiber composite material. Trailer deck 122 also comprises deck rails 106, which in this embodiment run along three sides of the deck: the front, left, and right sides. Deck rails 106 may be made of similar materials as trailer deck 122. Attached to chassis 116 are drawbar tie points 114, which may be used, for example, to connect safety chains between chassis 116 and a tow vehicle. Trailer 100 further comprises tires 110 and fenders 102 (which may alternatively be referred to as tire guards or mud guards).

Figure 1B:
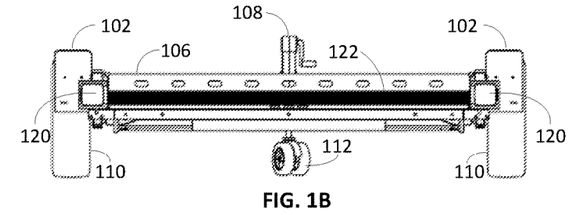

FIG. 1B shows a view of the same trailer 100 down the long axis of trailer 100 and from the back, loading end. Many of the same features described with respect to FIG. 1A are also visible in FIG. 1B as well as additional details. In particular, FIG. 1B depicts trailer deck 122 and lights 120. For example, lights 120 may be single or multi-element lights, which may indicate braking, turning, reversing, or the like.

Figures 1C, 1D:
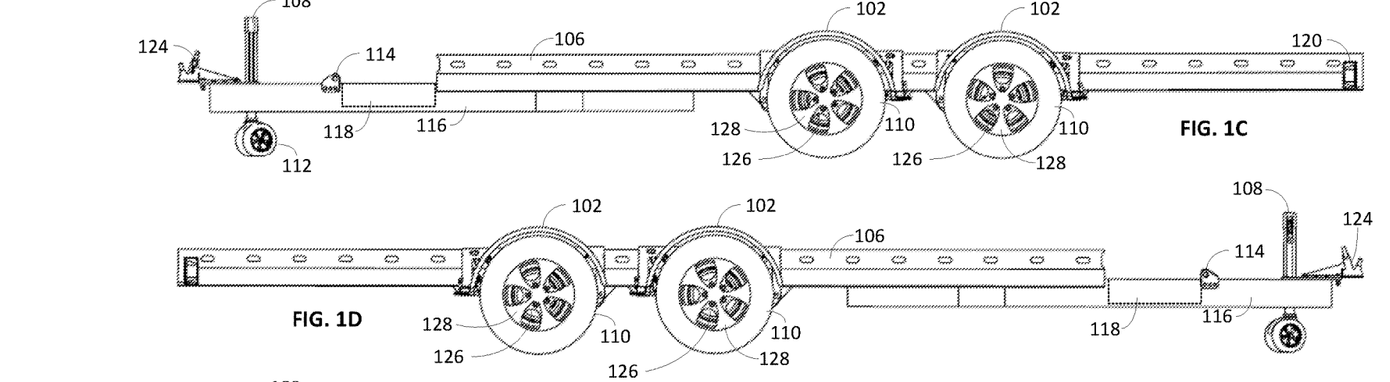

FIGS. 1C and 1D show views of the same trailer 100 from the left and right sides (i.e. down the short axis of trailer 100), respectively. Many of the same features described with respect to FIGS. 1A and 1B are also visible in FIGS. 1C and 1D as well as additional details. In particular, FIGS. 1C and 1D depict hitch receiver 124 connected to chassis 116. Hitch receiver 124 may be used to connect trailer 100 to a tow vehicle with a compatible tow hitch, such as a tow hitch ball or the like. Notably, the depicted hitch receiver 124 is but one option, and other types of hitch receivers, such as couplers, rings, and others are possible. In the embodiment depicted in FIGS. 1C and 1D, a frame element of chassis 116 extends from hitch receiver 124 underneath trailer deck 122, but only partially down the length of trailer deck 122. In particular, in the depicted embodiment, the frame elements of chassis 116 end before the axle 140 and swing arm 138. In other embodiments, the frame elements of chassis 116 may extend further down the length of trailer deck 122.

Trailer 100 further comprises wheels 128 upon which tires 110 are mounted, and brakes 126 are visible through wheels 128. Trailer 100 further comprises equipment enclosure 118 (as indicated by the dashed line), which is mounted between two frame elements of chassis 116. Equipment enclosure 118 will be described further with respect to FIG. 6, below.

Figure 1E:
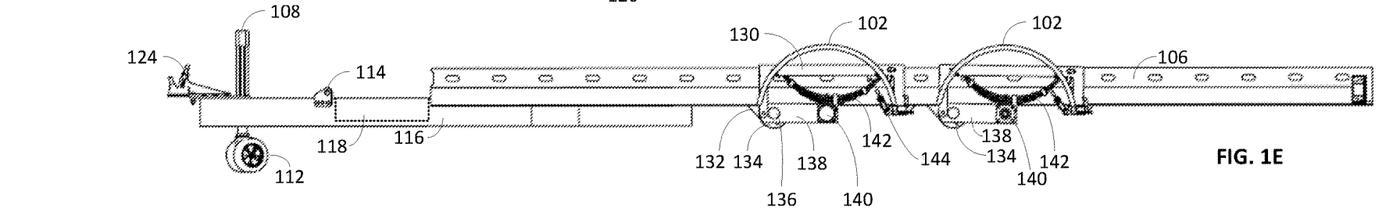

FIG. 1E shows a view of the same trailer 100 from the left side, but with wheels 128, tires 110, and brakes 126 removed to reveal additional features. In particular, FIG. 1E depicts outboard stub axle 140, which is the axle about which wheels 128 rotate. Stub axle 140 is connected to swing arm 138, and swing arm 138 is connected to inboard stub axle 136, which extends inward towards the center of trailer 100. Swing arm 138 is also connected to leaf spring 142 as well as lift arm 130. Together these aspects form an embodiment of a lowering assembly, which will be further described with respect to FIGS. 3A-3E, below.

In the embodiment depicted in FIG. 1E, swing arm 138 and lift arm 130 are substantially horizontal to the ground (not shown) while trailer 100 is in a raised position. In this embodiment, the horizontal position of swing arm 138 provides the greatest ground clearance while moving trailer 100, such as when towing trailer 100 behind a vehicle. In other embodiments, the arrangement of swing arm 138 and lift arm 130 may be different.

Figure 7:
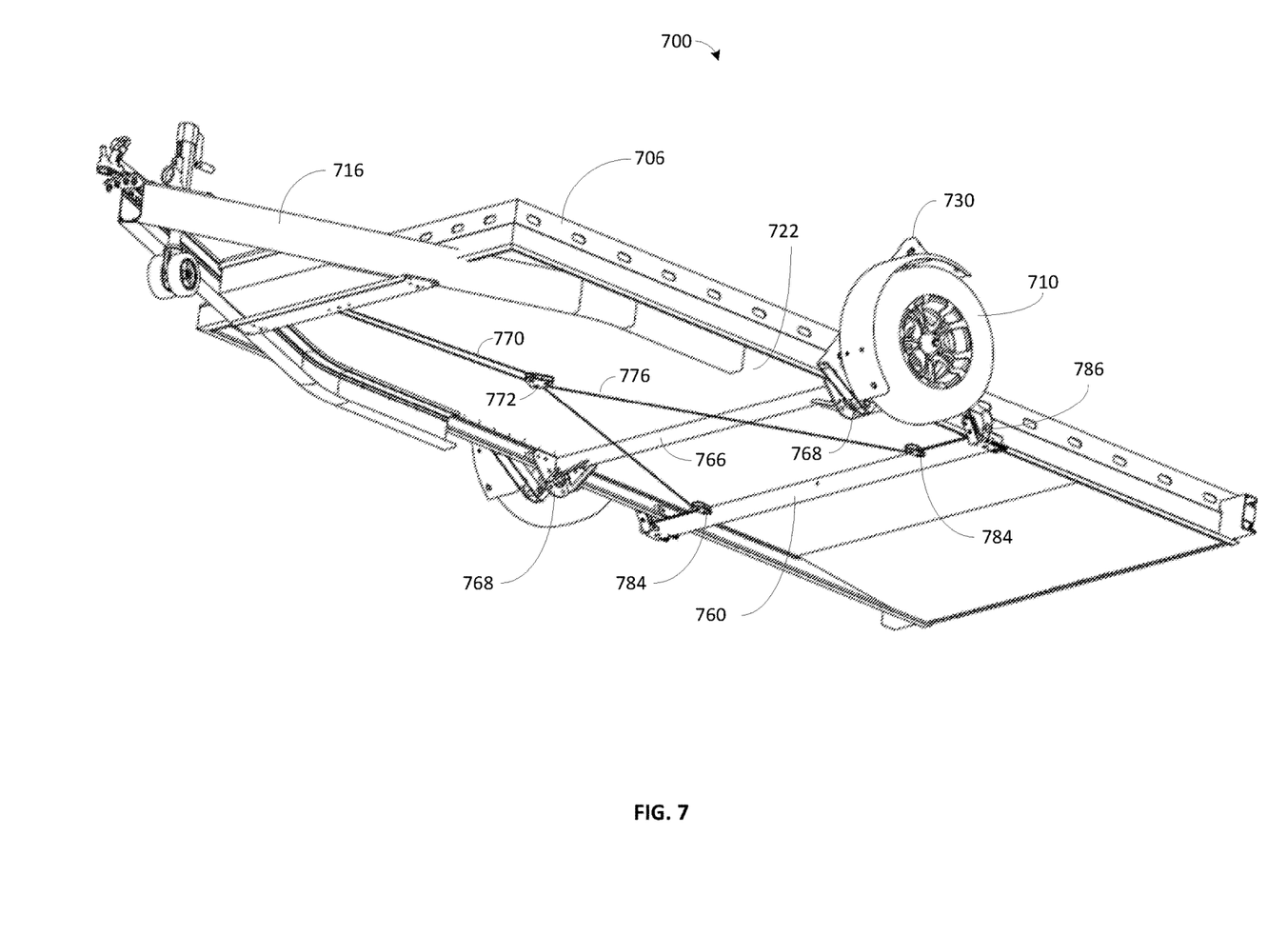
FIG. 7 depicts an embodiment of a single axle trailer

FIGS. 1A-1E depict trailer 100 in a tandem (or double) axle configuration with four wheels 128 and tires 110. Other embodiments may have, for example, a single axle configuration with only two wheels 128 and tires 110, such as depicted in FIG. 7. Still other embodiments may have more axles and/or more wheels 128 and tires 110 per axle as compared to the depicted embodiment. As described in more detail below, the lowering assembly elements of trailer 100 are modular and can be deployed in a variety of configurations designed to address specific use cases or load capacities.

FIGS. 2A-2D depict different views of an improved trailer 100 in a lowered position. Many of the same features described with respect to FIGS. 1A-1E are also visible in FIGS. 2A-2D as well as additional details.

Figure 2A:
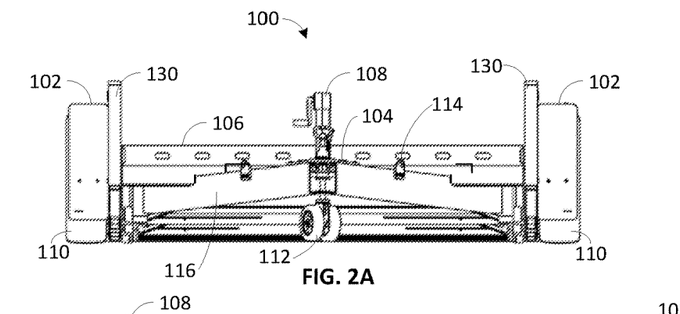
FIGS. 2A-2D depict different plan views of an improved trailer in a lowered position.

FIG. 2A shows a view of trailer 100 down the long axis of trailer 100 and from the front, non-loading end. As compared to FIG. 1A, lift arms 130 are shown in a more upright position due to the lowered position of trailer 100, and fender 102 is shown rotated forward around the rotation axis of tire 110 for the same reason. Notably, lift arms 130 are outboard of trailer deck 122 in order that they may rotate up and down as trailer 100 is raised and lowered. Further, lift arms 130 are located along the length of trailer deck 122, but do not extend in front of or behind the length of trailer deck 122 no matter the orientation of trailer deck 122 (i.e., whether or not it is raised or lowered).

Figure 2B:
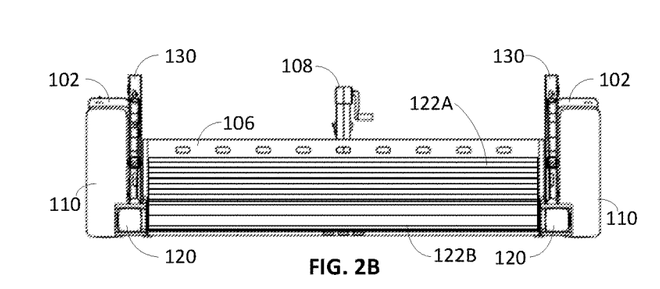

FIG. 2B shows a view of trailer 100 down the long axis of trailer 100 and from the back, loading end. Here again, lift arms 130 are shown in a more upright position due to the lowered position of trailer 100, and fender 102 is shown rotated forward around the rotation axis of tire 110 for the same reason. Notably, the position of fender 102 while trailer 100 is in a lowered position provides an advantageously unrestricted view of tires 110 so that, for example, they may be inspected for tread wear, punctures, or other conditions.

Further in FIG. 2B, trailer deck 122 is shown with two distinct portions, 122A and 122B. Trailer deck portion 122A is a portion of trailer deck 122 that is substantially horizontal or level when trailer 100 is in the raised position (as shown in FIGS. 1A-1E), provided, however, that unbalanced loads on the trailer may cause trailer deck portion 122A to be out of level during operation. Trailer deck portion 122A may be alternatively referred to as the trailer deck level portion.

Trailer deck portion 122B is a portion of trailer deck 122 that is purposefully angled below the horizontal both when trailer 100 is in the raised or lowered position. Trailer deck portion 122B may alternatively be referred to as the trailer deck angled portion. Trailer deck portion 122B provides an advantageous approach angle 123 (i.e., the angle formed between trailer deck portion 122B and ground level 125) for a load being moved up trailer deck 122 from ground level 125 as shown in FIG. 2D. For example, in some embodiments, approach angle 123 (which may alternatively be referred to as the trailer deck angled portion ground inclination angle) may be equal to or less than 5 degrees, 4 degrees, 3 degrees, 2 degrees and so on. The low approach angle 123 allows for trailer 100 to accommodate loads with relatively low ground clearances and/or very shallow available approach angles, such as vehicles that sit low to the ground and/or have elements protruding from their loading ends that further reduce available approach angles. In this way, trailer deck portion 122B acts as an integrated ramp for trailer 100, without the need to deploy additional, standalone ramps.

Figure 2C:
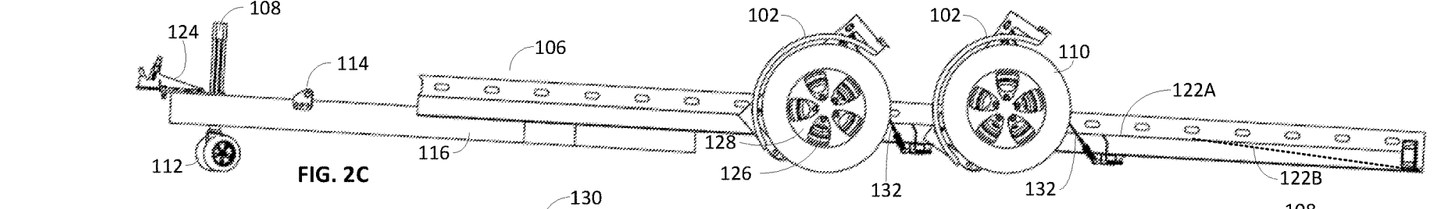
Figure 2D:
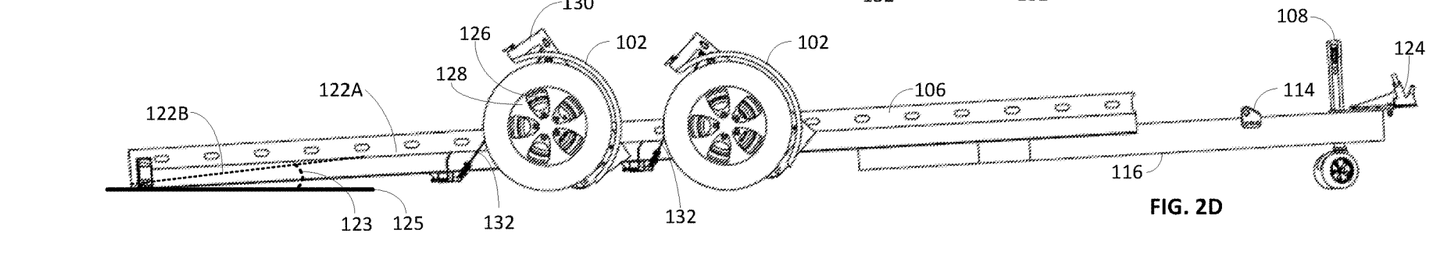

In the embodiment depicted in FIGS. 2B-2D, trailer deck portion 122B is shorter in length than trailer deck portion 122A, as measured down the long axis of trailer 100. In such embodiments, the longer trailer deck portion 122A may advantageously include more supporting structures below the top surface of trailer deck 122, such as weight supporting beams, or other structural components and/or accessories. In other embodiments, the length of trailer deck portion 122A relative to trailer deck portion 122B may be different. For example, trailer deck portions 122A and 122B may be approximately equal in length, or trailer deck portion 122B may be longer than trailer deck portion 122A. In yet further embodiments, trailer deck 122 may be at an angle relative to ground level 125 across its entire length.

Deck portions 122A and 122B are distinguished by an intersection in FIGS. 2B-2D where the angle of one portion changes directly to the angle of the other portion without further transition. However, in other embodiments, the transition from one trailer deck portion to another may be gradual, such as a curved or stepped transition over a set length or radius of curvature.

While in the embodiment depicted in FIGS. 2B-2D, trailer deck 122 has two distinct portions, 122A and 122B, in other embodiments trailer deck 122 could have more than two distinct portions, e.g., three or more distinct portions. In yet other embodiments, trailer deck 122 may transition from an angled portion to a level portion without definitive transition points, such as by way of a relatively large radius curvature from loading end to non-loading end.

FIGS. 2C and 2D further depict cabling 132, which controls the position of the lift arms 130 and thereby the position of trailer 100, i.e. between raised and lowered. Additional detail regarding cabling 132 will be discussed, below, with respect to FIG. 6.

FIGS. 3A-3F depict an embodiment of a lowering assembly 300 of trailer 100 (as depicted in FIGS. 1A-1E and 2A-2D). Lowering assembly 300 enables trailer 100 to raise and lower and as such may alternatively be referred to as a lifting assembly.

Figure 3A:
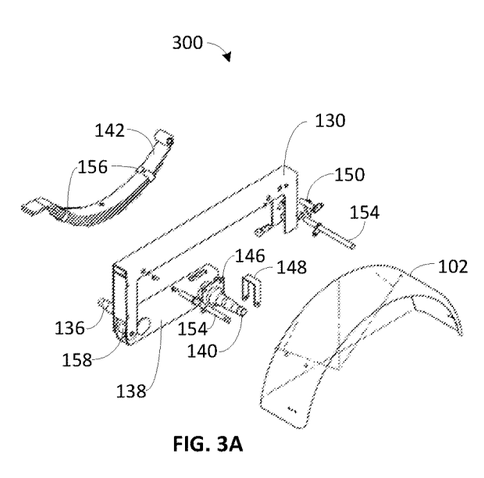
FIGS. 3A-3F depict aspects of an improved trailer.
Figure 3B:
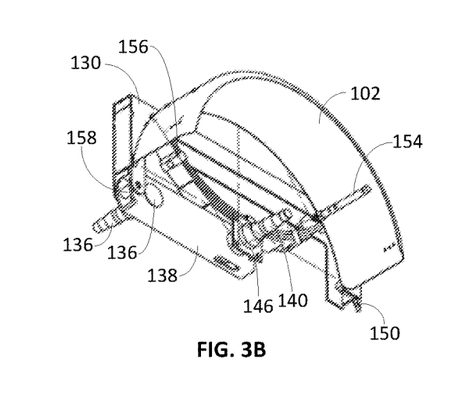
Figure 3C:
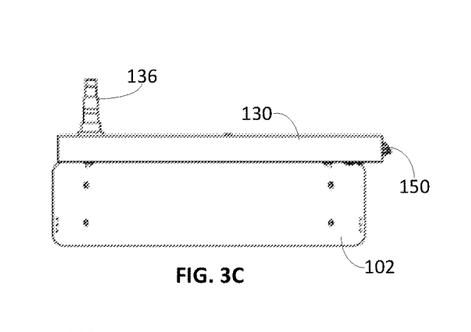
Figure 3D:
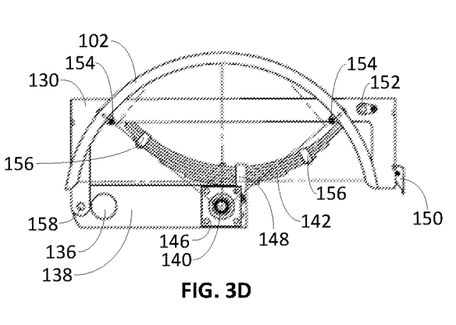
Figure 3E:
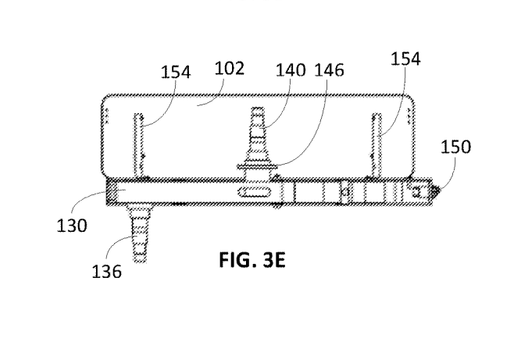

FIG. 3A is a semi-exploded view of lowering assembly 300. Lift arm 130 (alternatively referred to as a lowering arm or c-frame element) is attached via a hinge pin 158 (and associate joint) to swing arm 138 at the forward side of swing arm 138 (i.e. the side closest to the non-loading end of trailer 100). Hinge pin 158 allows lift arm 130 to rotate relative to swing arm 138 (and vice versa) about an axis defined by hinge pin 158 while maintain a strong, weight-bearing connection. When combined with leaf spring assembly 142, and lift arm 130, swing arm 138 acts as a suspension system element that allows a wheel and tire (not shown) to move up and down, thereby compressing and extending leaf spring assembly 142.

In this embodiment, swing arm 138 is less than half the length of lift arm 130 (as measured down the long axis of each). In other embodiments, swing arm 130 may be approximately half the length of lift arm 130 or more than half the length of lift arm 130.

Attached to lift arm 130 are mounting bars 154, which attach to and support fender 102. Mounting bars 154 are not a necessary feature of lowering assembly 300, but are depicted for completeness.

Also attached to lift arm 130 is leaf spring assembly 142, which includes a plurality of leaf spring elements and rebound clips 156. Though not shown in FIG. 3A, leaf spring assembly 142 attaches to lift arm 130 via retaining bolts or pins, such as leaf spring mounting pin 152 in FIG. 3D. In other embodiments, other forms of suspension or shock absorbing components may be used, such as coil springs or hydraulic or pneumatic shock absorbing systems. In yet other embodiments, a solid connection could be used in lieu of suspension or a shock absorbing component.

Figure 6:
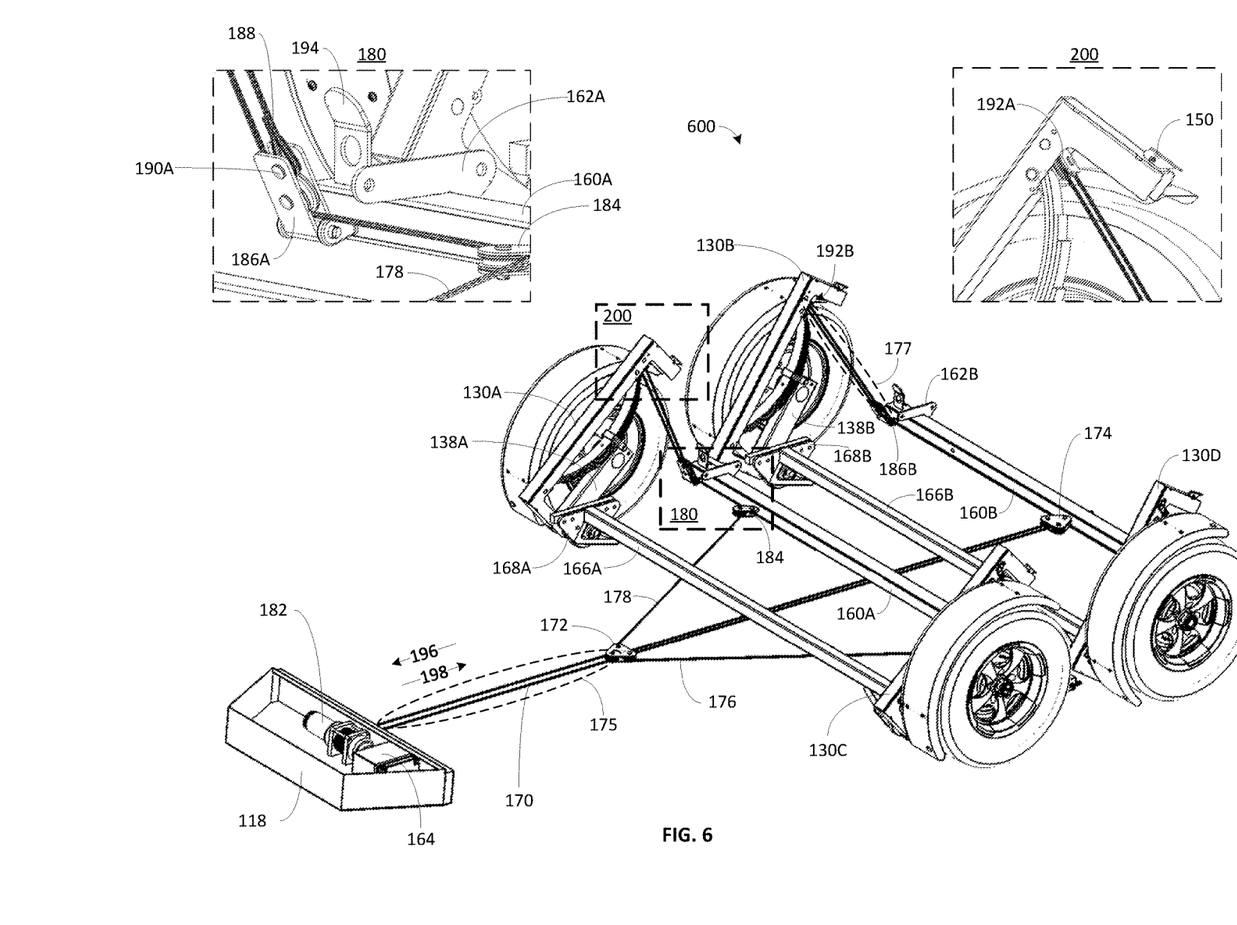
FIG. 6 depicts aspects of a lowering system for an improved trailer in a lowered position.

Also attached to lift arm 130 is locking mechanism 150, which in this embodiment is a plunger-type lock that engages with an aperture in lift arm locking plate 194 (not shown) attached to a mount beam (not shown), as will be further described with respect to FIG. 6. Locking mechanism 150 is a safety feature which prevents movement of lift arm 130 during regular operation of a trailer, such as when the trailer is being moved or towed behind a vehicle.

Swing arm 138 is attached to outboard stub axle 140, which is the functional axle for a wheel and tire combination, such as shown in FIGS. 1A-1D. In this embodiment, outboard stub axle 140 is located on the side of swing arm 138 toward the rear, loading end of trailer 100 (not shown). Outboard stub axle 140 may be permanently attached to swing arm 138 or removably attached via bolts or other appropriate hardware. Outboard stub axle 140 is also attached to brake backing plate 146, which allows for mounting a brake unit as shown in FIGS. 4A-4F.

Swing arm 138 is also attached to inboard stub axle 136, which is the functional axle for allowing swing arm 138 to rotate relative to a trailer axle, as is shown, for example, in FIG. 6. Inboard stub axle 136 is located on the side of swing arm 138 toward the front, non-loading end of trailer 100 (not shown). In this embodiment, stub axle 136 is attached to hub 134 by studs 129. Swing arm 138 is also attached to leaf spring saddle 148, which links leaf spring assembly 142 to swing arm 138 and allows for swing arm 138 to act as a suspension component, as described above.

Figure 3F:
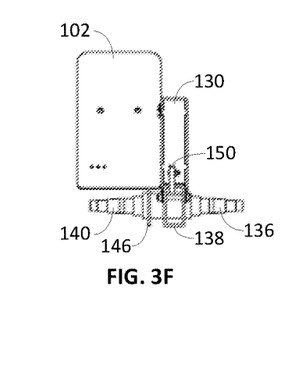

FIGS. 3B-3F depict an assembled lowering assembly 300 from a position below and offset, directly above, directly to the side, directly below, and directly down the long axis of lowering assembly 300, respectively. Many of the same features described with respect to FIG. 3A are also visible in FIGS. 3B-3F. In particular, FIG. 3F shows that the outboard stub axle 140 and the inboard stub axle 136 have substantially coplanar axes of rotation in this embodiment.

FIGS. 4A-4F depict aspects of an embodiment of a swing arm assembly 400 of trailer 100 (as depicted in FIGS. 1A-1E and 2A-2D). Swing arm assembly 400 enables a wheel and tire attached to outboard stub axle 140 to move up and down relative to a lift arm in order to act as a suspension component of trailer 100.

Figure 4A:
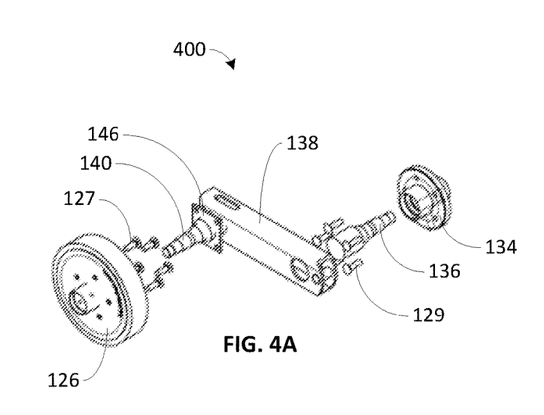
FIGS. 4A-4F depict aspects of an improved trailer.
Figure 4B:
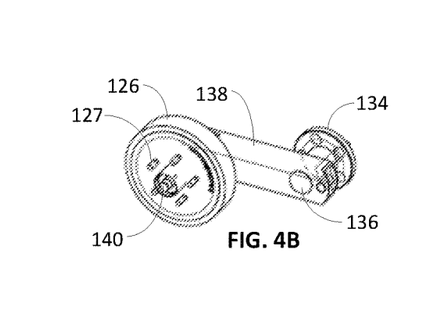
Figures 4C, 4D:
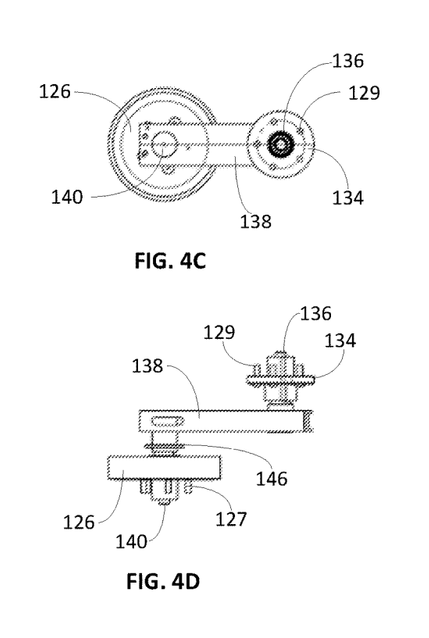
Figure 4E:
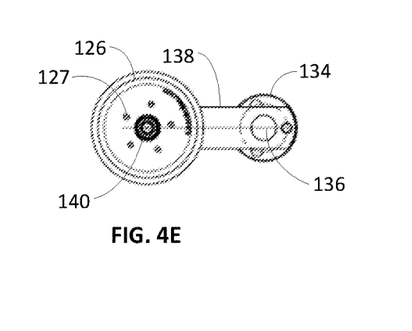
Figure 4F:
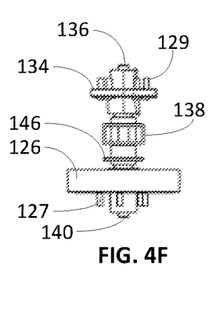

FIG. 4A is a semi-exploded view of swing arm assembly 400. As described above, swing arm 138 is attached to outboard stub axle 140, which is the functional axle for a wheel and tire combination. Outboard stub axle 140 includes brake backing plate 146, which allows for attaching brake assembly 126. Brake assembly 126 may be, for example, a drum-type brake (as depicted) or a disc-type brake (in other embodiments), and may be used to apply braking force to an attached wheel and tire combination so as to reduce the speed of a trailer. Wheel studs 127 may be used to attach a wheel and tire combination, such as wheel 128 and tire 110 in 1A-1E and 2A-2D, to brake assembly 126.

As above, swing arm 138 is also attached to inboard stub axle 136, which is the functional axle for allowing swing arm 138 to rotate relative to a trailer axle, as is shown, for example, in FIG. 6. Inboard stub axle 136 is mated or otherwise connected to and rotates within hub 134. Hub 134 is attached to a trailer axle endplate as shown in FIG. 6. Notably, the attachment of hub 134 to an axle endplate is only one method of attaching the hub to the axle, and others are possible, such as a direct attachment to the axle.

FIGS. 4B-4F depict an assembled swing arm assembly 400 from a position above and offset, from the inside, directly above, from the outside, and down the long axis of the assembly, respectively. Many of the same features described with respect to FIG. 4A are also visible in FIGS. 4B-4F.

Figure 5:
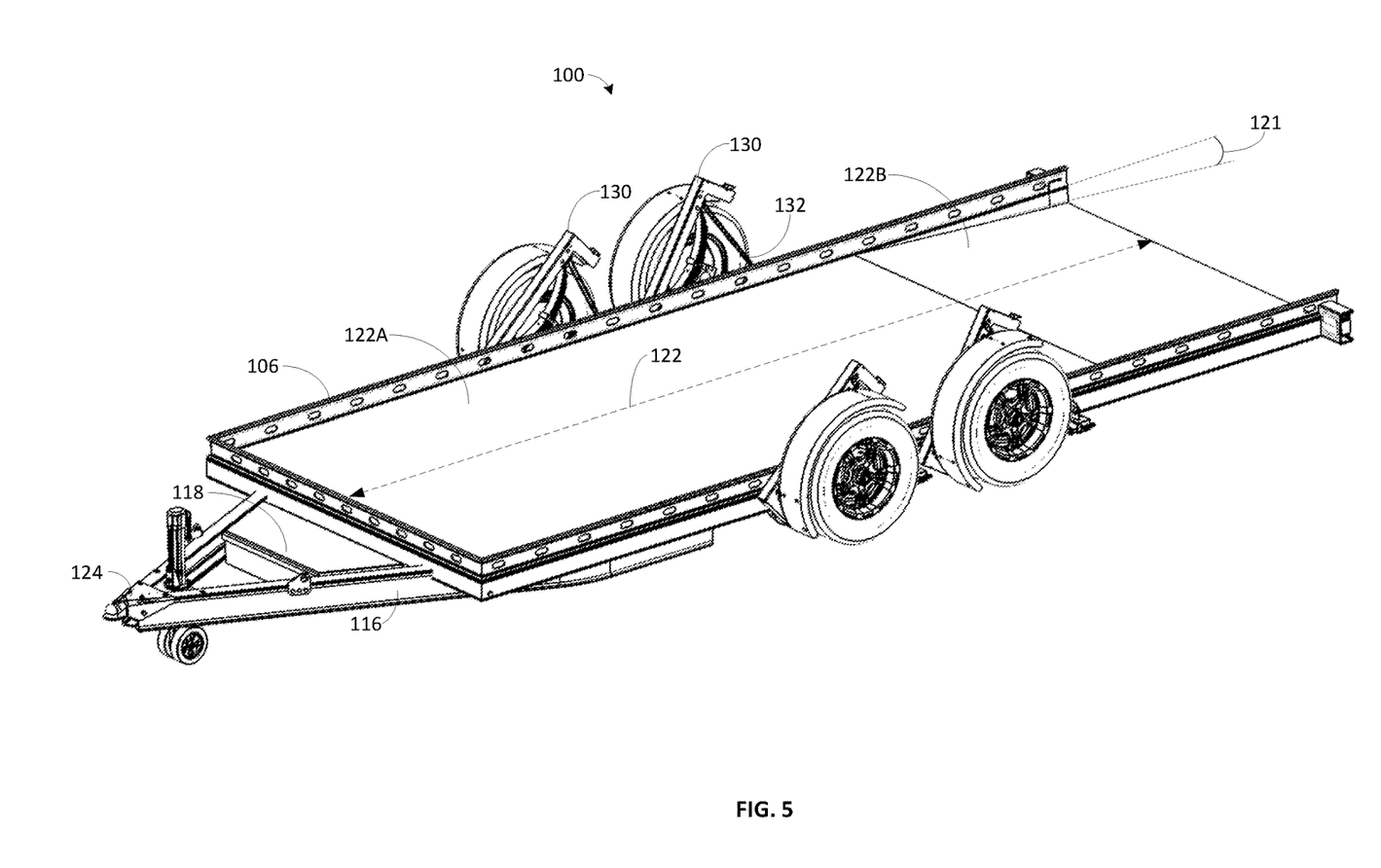
FIG. 5 depicts an isometric view of an improved trailer in a lowered position.

FIG. 5 depicts an isometric view of an improved trailer 100 in a lowered position. As in FIG. 2B, trailer deck 122 is shown with two distinct portions, 122A and 122B. Here, as above, trailer deck portion 122A (also known as the trailer deck level portion) is a portion of trailer deck 122 that is substantially horizontal or level when trailer 100 is in the raised position, and trailer deck portion 122B (also known as the trailer deck angled portion) is a portion of trailer deck 122 that is purposefully angled below the plane formed by deck portion 122A (i.e. the trailer deck level portion). The angle 121 of trailer deck portion 122B is shown here with reference to the angle of trailer deck portion 122A (as compared to with reference to the ground level above in FIG. 2B) and may be alternatively referred to as the trailer deck angled portion declination angle. In various embodiments, angle 121 may be equal to or less than 5 degrees, 4 degrees, 3 degrees, 2 degrees, and so on.

As described above, trailer deck portion 122B provides an advantageous approach angle for a load being moved up trailer deck 122 from a ground level. As shown in FIG. 5, the loading end of trailer deck portion 122B (i.e., the end closest to the ground level) abuts the ground level to allow for impediment free loading. While not shown in FIG. 5, trailer 100 may include bumpers or the like underneath trailer deck portion 122B in order to avoid damaging trailer deck portion 122B (or any other portion of trailer 100) when lowering trailer 100 to the ground level. The bumpers may be any sort of impact and/or abrasion resistant material and may be removable and replaceable to allow for long-term use of trailer 100.

Trailer deck portions 122A and 122B may include surface treatments, such as texturing, ridges, groves, stippling, high grip surface coatings, and others in order to provide grip to loads (and users) on trailer deck 122. In some embodiments, trailer deck portions 122A and 122B may have different surface treatments, while in others the surface treatment of each may be the same. Though not shown in FIG. 5, trailer deck 122 may also include one or more attachment points for mounting straps, cables, or the like in order to tie down a load on trailer deck 122 and prevent it from moving while trailer 100 is moving. In some embodiments, the attachment points may be raised or counter-sunk with respect to trailer deck 122, such as mounting brackets, flanges, hooks, or rings. In some embodiments, the attachment points may be apertures in trailer deck 122, such as the apertures shown in deck railing 106.

FIG. 5 also depicts an equipment enclosure 118 installed between frame elements of chassis 116. The equipment enclosure may enclose functional aspects of trailer 100, such as a winch, and may also be used for general storage purposes. Equipment enclosure 118 may be permanently affixed to chassis 116 or removably affixed.

FIG. 5 also depicts a hitch receiver 124, which may be permanently or removably affixed to chassis 116. In the depicted embodiment, hitch receiver 124 is removably affixed to chassis 116 by way of appropriate hardware. The ability to remove hitch receiver 124 is advantageous because it allows for customization of the type of hitch receiver used for different users, such as the use of different hitch receivers in different countries, or the use of different hitch receivers with different vehicle hitch designs, without otherwise modifying the design of trailer 100.

FIG. 6 depicts aspects of a lowering system 600 for an improved trailer in a lowered position, such as trailer 100 (as depicted in 2A-2D). In particular, FIG. 6 depicts the functional aspects of lowering system 600 of trailer 100 without the trailer deck or chassis shown in order to reveal additional features.

In this embodiment, trailer lowering system 600 includes two axle beams, 166A and 166B. Each axle beam 166A and 166B includes two axle endplates, 168A and 168B, respectively (though only one of each is visible in FIG. 6). Axle endplates 168A and 168B attach to respective axle hubs 134 (also known as idler hubs) and allow for swing arms 138 to rotate around the inboard stub axle (as described with respect to FIGS. 4A-4F). Though not shown in FIG. 6, the axle beams are attached to trailer deck 122 (not shown) at suitable mounting points and are capable of applying a lifting force across the entire width of trailer deck 122 (not shown).

The embodiment depicted in FIG. 6 includes two axle beams 166A and 166B in what may be referred to as a tandem axle beam configuration, but other embodiments may have fewer or more axle beams depending on the intended load capacity of the trailer. For example, a trailer meant to carry smaller loads may have a single axle beam configuration, such as depicted in FIG. 7. The modular design of lowering system 600 advantageously allows for a wide range of configurations while using the same parts and mechanical principles.

Trailer lowering system 600 also includes two mount beams 160A and 160B, which provide structural support for aspects of trailer lowering system 600 as described further below. Like axle beams 166A and 166B, mount beams 160A and 160B are attached to a lower surface of trailer deck 122 (not shown) at suitable mounting points, for example using a mount plate like mount plate 162A shown in box 180.

The position of trailer lowering system 600 (i.e., between raised and lowered) is controlled in part by electric winch 182, winch cable 170, and lifting cables 176 and 178. In particular winch cable 170 (alternatively referred to as a control cable) is attached to winch 182 at one end and run through pulley assembly 172 back towards winch 182 to a cable termination point (not shown). The cable termination may be attached to winch 182, to equipment enclosure 118, to chassis 116 (not shown) or to any other suitable spot. Notably, while an electric winch 182 is depicted in this embodiment, other means of controlling winch cable 170 are possible. For example, a manual (i.e. hand-cranked) winch could also be used. Winch cable 170 and lifting cables 176 and 178 may be made of any material of suitable strength, such as a braided steel cable, a braided fabric cable, a solid cable, a chain, and others. In embodiments such as that shown in FIG. 6, it is preferable that winch cable 170 and lifting cables 176 and 178 have a circular cross-section so that they mate securely with pulleys used in lowering system 600.

Lifting cable 178 has a first end 188 terminated around a cable retaining pin 190A as shown in box 180. In other embodiments, lifting cable 178 may be terminated by other means, for example, not using a pin. From pin 190A, lifting cable 178 then travels up and around lift arm hinged pulley assembly 192A, which is mounted within lift arm 130A as depicted in box 200. From there, lifting cable 178 travels back down towards its first end 188 and then turns through mount beam hinged pulley assembly 186A, which is mounted to mount beam 160A, as shown in box 180. From there, lifting cable 178 travels through mount beam fixed pulley assembly 184 towards front pulley assembly 172, which may also be referred to as a control pulley assembly. From front pulley assembly 172, lifting cable 178 travels towards mount beam 160B and through rear pulley assembly 174, which is attached to mount beam 160B. From rear pulley assembly 174, lifting cable 178 travels towards and then through mount beam hinged pulley assembly 186B and then upwards towards another lift arm hinged pulley assembly 192B mounted within lift arm 130B (not shown, but in similar fashion as depicted in box 200). From there, lifting cable 178 travels back down toward mount beam hinged pulley assembly 186B, which is mounted to mount beam 160B, and is terminated in similar fashion as is shown in box 180.

Lifting cable 176 follows a mirrored but otherwise symmetric path as that of lifting cable 178 through hardware on the other side of the trailer, including lift arms 130C and 130D.

Notably, while the hinged pulley assemblies and the fixed pulley assemblies are mounted to the mount beams in this embodiment, in other embodiments they may be mounted to another structural component. For example, they may be mounted directly to a surface of the trailer deck, or to a bracket attached to a surface of the trailer deck, or the like.

In order to lower a trailer using trailer lowering system 600, electric winch 182 unwinds winch cable 170 so that the winch cable loop 175 formed between electric winch 182 and the winch cable termination point (through front pulley assembly 172) gets longer. In particular, as winch cable 170 is unwound from electric winch 182, and as the winch cable 172 loop gets larger, front pulley assembly 172 moves in the direction of arrow 198 (towards the loading end of the trailer), which causes lifting cable 176 (and 178 in a similar fashion) to move through mount beam fixed pulley assembly 184, mount beam hinged pulley assemblies 186A and 186B, and lift arm hinged pulley assemblies 192A and 192B (not shown) in such a way that lift arms 130A and 130B rotate towards an upright position via their respective attachment to swing arms 138A and 138B, which in-turn rotate about their respective inboard stub axles, as described above with respect to FIGS. 3A-3F and 4A-4F). In particular, as front pulley assembly 172 moves in the direction of arrow 198, tension is released from each lifting cable (e.g. 178), and the rear end of each lifting arm (e.g., 130A) pulls away from each lifting cable termination point (e.g., 190A) on each mount beam hinged pulley assembly (e.g., 186A), which is attached to a respective mount beam (e.g., 160A). The same is true of lifting cable 176 and the swing arms on the other side of the trailer. The resulting reduction in force applied to each axle beam (e.g., 166A) via each lift arm's (e.g. 130A) connection to a swing arm (e.g., 138A) allows the trailer deck to lower while still supporting the weight of the trailer and any load thereupon.

Similar to the winch cable loop 175 formed between electric winch 182 and the winch cable termination point, the lifting cables form loops, which may be referred to as lift arm control loops, between each lift arm hinged pulley assembly and each mount beam hinged pulley assembly. For example, lift arm control loop 177 is formed between lift arm hinged pulley assembly 192B and mount beam hinged pulley assembly 186B. So as winch 182 unwinds winch cable 170, winch cable loop 175 and the lift arm control loops (e.g., 177) get longer, allowing the trailer to be lowered.

Notably, the mount beam hinged pulley assemblies (e.g. 186A and 186B) and lift arm hinged pulley assemblies (e.g., 192A and 192B) allow for lifting cables 176 and 178 to maintain correct alignment with each pulley during raising and lowering operations. Without these hinged pulley assemblies, the movement of lift arms 130A-D during raising and lowering operations (and the associated change in orientation of the pulley assemblies during the same) could cause the lifting cables to apply uneven pressure on the pulley assemblies leading to premature wear of the assemblies, or even cause lifting cables 176 and 178 to come out of the groves in the pulley assemblies completely, thereby causing binding of the system.

Further, front pulley assembly 172 is able to rotate about its vertical axis, owing to the pulley wheels, which allows for even lifting of each side of the trailer despite any mismatch in tension between lifting cable 176 and lifting cable 178. For example, if the weight on one side of the trailer (e.g., acting on lift arms 130A and 130B) is higher than the weight on the other side of the trailer (e.g., acting on lift arms 130C and 130D), then front pulley assembly 172 will rotate to balance the tension in the cables and allow for even raising and lowering operations. In some embodiments, rear pulley assembly 174 is likewise able to rotate via its attachment point to mount beam 160B in order to provide even more load balancing of trailer lowering system 600.

In order to raise a trailer using trailer lowering system 600, electric winch 182 winds in winch cable 170 so that the loop formed between electric winch 182 and the cable termination point (through front pulley assembly 172) gets shorter. In particular, as winch cable 170 is wound in, and as the winch cable 172 loop gets shorter, front pulley assembly 172 moves in the direction of arrow 196 (towards the non-loading end of the trailer), which causes lifting cable 176 (and 178 in a similar fashion) to move through mount beam fixed pulley assembly 184, mount beam hinged pulley assemblies 186A and 186B, and lift arm hinged pulley assemblies 192A and 192B in such a way that lift arms 130A and 130B rotate towards a horizontal or level position via their respective attachment to swing arms 138A and 138B, which in-turn rotate about their respective inboard stub axles. Swing arms 138A and 138B are motivated to move in this manner by the force of winch cable 170 acting through front pulley assembly 172 on lifting cable 178, which then acts on lift arms 130A and 130B, respectively. In particular, as each lifting cable (e.g. 178) is drawn forward by front pulley assembly 172, the rear end of each lifting arm (e.g., 130A) is drawn towards the cable termination point (e.g., 190A) on each mount beam hinged pulley assembly (e.g., 186A), which is attached to a respective mount beam (e.g., 160A). The same is true of lifting cable 176 and swing arms 130C and 130D on the other side of the trailer. The resulting force applied to each axle beam (e.g., 166A) via each lift arm's (e.g. 130A) connection to a swing arm (e.g., 138A) and each swing arm's connection to an axle hub, as well as the force applied to each mount beam (e.g., 160A) via the tension in the lifting cable (e.g., 178) between a lift arm hinged pulley assembly (e.g., 192A) and a mount beam hinged pulley assembly (e.g., 186A), raises the trailer deck. Accordingly, in the embodiment depicted in FIG. 6, only three cables are needed to control the position of trailer 100.

As described above, but in a reverse direction, as winch 182 winds in winch cable 170, the winch cable loop 175 and the lift arm control loops (e.g., 177) each get smaller, which raises the trailer.

When in a fully raised position, each lift arm (e.g., 130A-D) can be locked in place via a locking mechanism 150. In particular, a locking element of locking mechanism 150, such as a pin or plunger or the like, may be inserted through an aperture in a locking plate, such as locking plate 194 shown in box 180 of FIG. 6. In this way, the raised orientation of the trailer is ensured during use of the trailer, such as when the trailer is being towed behind a vehicle. Notably, even if a failure of the cabling system occurred, the locking mechanism on each lift arm would maintain the position of the lift arms and thereby the orientation of the trailer.

In the embodiment depicted in FIG. 6, locking mechanism 150 is a mechanism that can be manually operated by a user. In other embodiments, locking mechanism may be biased towards the locked position (e.g., by a spring) so that when the locking element comes in contact with the locking plate, it automatically deploys into the aperture in locking plate 194. In other embodiments, locking mechanism 150 may be remotely or automatically operable, such as by use of an electronic solenoid or other activation means.

Equipment enclosure 180 houses many of the electrical components of trailer lowering system 600. For example, equipment enclosure 180 includes electric winch 182 and battery 164 in the embodiment depicted in FIG. 6. But other equipment may be included. For example, equipment enclosure may include one or more struts so that a lid or cover to the enclosure (not shown) may be propped open while accessing the interior space of enclosure 180. Equipment enclosure 180 may also include a solar panel on its cover (not shown) and a charging circuit in order to provide a renewable trickle charge to battery 164, such that battery 164 maintains a useable charge at all times. Further, equipment enclosure 180 may include a switch to operate winch 182 and/or ports to attach a wired remote control to electric winch 182 so that a user may control the operation of the winch (and thereby the orientation of the trailer) from a remote location. Equipment enclosure may also include a switch to activate or deactivate battery 164, such as for long term storage. Equipment enclosure 180 may also include a lock so that equipment within the enclosure can only be accessed by appropriate users.

In some embodiments, equipment enclosure 180 may include an electronic controller connected to a signal receiver, such as an antenna, so that operation of electric winch 182 may be controlled, for example, by wireless remote control. In some embodiments, the wireless remote control may be a physical controller, while in other embodiments it may be a software controller, such as an application running on a wireless device, such as a smart phone, tablet computer, or personal computer. The controller may further enable status monitoring of the trailer's orientation and equipment, such as charge of the battery or condition of the winch. The controller may also monitor and control the status of the lift arm locking mechanisms. In some embodiments, equipment enclosure 180 may include a transceiver connected to an electronic controller so that two way communication may be established with a remote control system, such as an application running on a personal electronic device, such as a smart phone, tablet computer, or personal computer.

In some embodiments, equipment enclosure 180 includes a brake controller, which may interface with a vehicle directly, or which may control the operation of the brakes via some other logic.

In some embodiments, equipment enclosure 180 may include a light controller, which may interface with a vehicle directly, or which may control the operation of the trailer's lights via some other logic.

In some embodiments, equipment enclosure 180 may include a GPS location device, for example powered by battery 164, which provides a periodic location of the trailer for tracking and theft prevention purposes.

FIG. 7 depicts an embodiment of a single axle trailer 700 from a position below the trailer. In this embodiment, the trailer lowering system includes a single axle beam 766A, which includes two axle endplates 768. Axle endplates 768 attach to respective axle hubs (not shown) and allow for swing arms (not shown) to rotate around the inboard stub axle (as described with respect to FIGS. 4A-4F). Here, axle beam 766 is shown attached to the bottom of trailer deck 722 at suitable mounting points (not shown) such that axle beam 766 is capable of applying a lifting force across the entire width of trailer deck 722. Notably, trailer deck 722 may comprise a top surface and a bottom surface as well as intervening layers or structures (e.g., support layers or structures). Mounting points on trailer deck 722 may be located on surfaces or within intervening layers of trailer deck 722 such that the attachment between the axle beam and the trailer deck enables force to be applied to trailer deck 722.

Trailer 700 also includes a mount beam 760, which provide structural support for aspects of its trailer lowering system. Like axle beam 766, mount beam 760 is attached to trailer deck 122 at suitable mounting points, for example using a mount plate like mount plate 162A described above.

The position of trailer 700 is controlled in part by an electric winch (not shown), winch cable 770, and lifting cable 776. Unlike the embodiment described in FIG. 6, this embodiment comprises a single lifting cable 776 that controls both lifting arms 130 of trailer 100. In particular, lifting cable 176 has a first end terminated around a first cable retaining pin on a first side of the trailer (not shown) as described above. From the first cable retaining pin, lifting cable 776 then travels up and around a first lift arm hinged pulley assembly (not shown), which is mounted within a first lift arm 130, as described above. From there, lifting cable 776 travels back down towards its first end and then turns through a first mount beam hinged pulley assembly 786 on the first side of the trailer, which is mounted to mount beam 760, as described above. From there, lifting cable 776 travels through a first mount beam fixed pulley assembly 784 on the first side of the trailer and then on towards front pulley assembly 772. From front pulley assembly 772, lifting cable 178 travels back towards mount beam 760 and through a second fixed pulley assembly 784 on a second side of the trailer, which is attached to mount beam 760. From the second fixed pulley assembly 784, lifting cable 776 travels towards and then through a second mount beam hinged pulley assembly 786 and then upwards towards a second lift arm hinged pulley assembly (not shown) mounted within a second lift arm 730 on the second side of the trailer. From there, lifting cable 776 travels back down toward the second mount beam hinged pulley assembly 786, which is mounted to mount beam 760, and is terminated at a second cable retaining pin in similar fashion as described above. Accordingly, in the embodiment depicted in FIG. 7, only two cables are needed to control the position of trailer 700.

Figure 8:
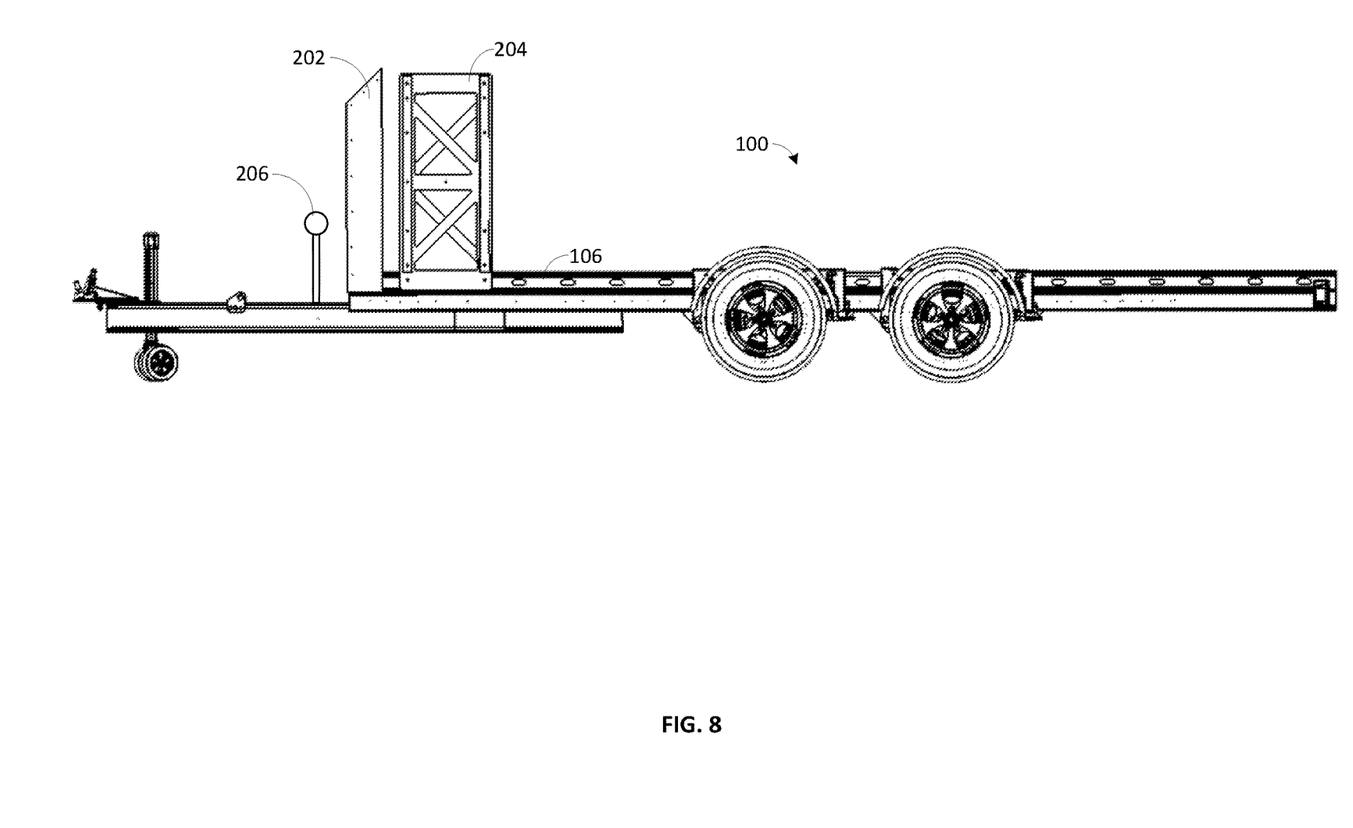
FIG. 8 depicts different aspects of an improved trailer.

FIG. 8 depicts some exemplary accessories that may be used with an improved trailer, such as describe red herein. For example, trailer 100 may include a wind screen 202 (alternatively referred to as a rock guard) that protects any load on the trailer from wind and debris during operation of the trailer. In some embodiments, the wind screen may additionally provide aerodynamic improvement for the trailer during operation, such as by directing wind up and around the load.

Trailer 100 may also include an equipment rack 204, which may, for example, be used to carry tires, or fuel containers, or any other equipment a user desires.

Trailer 100 may also include a recovery winch 206, which may be used to attach to a load, such as a vehicle, and to pull the load up onto the trailer deck. In some embodiments, the recovery winch may be powered by a battery in the equipment enclosure (not shown) and may be controlled by a wired or wireless remote control.

Trailer 100 also includes a plurality of apertures in deck rail 106, which may be used as attachment points for other accessories, such as tie-down.

Trailer 100 may also be fitted with an enclosure (not shown) so that any load is protected from the elements.

While embodiments herein have been described improved trailers primarily in the context of loading and unloading vehicles, the features described herein, such as the lowering system, are equally applicable to trailers usable for other purposes. For example, an improved trailer with a lowering system such as described herein may be configured to carry watercraft, such as boats, jet skis, and the like, or livestock, such as horses and cows, or specialized heavy machinery, such as tractors, and so on. Wherever placing a load on a trailer is benefited by a trailer with movable orientation from raised to lowered, then the features of an improved trailer as described herein are useful.

Persons of skill in the art will appreciate that the specific embodiments described herein are exemplary only, and other embodiments with other combinations of the features described herein are possible and within the scope of this disclosure.

What is claimed is:

1. A trailer system, comprising:
a chassis;
a deck connected to the chassis, the deck comprising a level portion and an angled portion;
a winch connected to a winch cable;
a pulley assembly connected to the winch cable and further connected to a first lifting cable;
a first axle beam connected to the deck and further connected to a first axle hub; and
a first lifting assembly, comprising:
a first hinged pulley assembly;
a first mount beam connected to the deck and further connected to the first hinged pulley assembly;
a first fixed pulley assembly connected to the first mount beam, wherein the first lifting cable passes through the first fixed pulley assembly and the first hinged pulley assembly;
a first swing arm connected to a first outboard stub axle and further connected to a first inboard stub axle, the first inboard stub axle being further connected to the first axle hub; and
a first lift arm connected to the first swing arm by a first hinge, the first lift arm comprising a second hinged pulley assembly connected to the first lift arm,
wherein a first end of the first lifting cable is connected to the first hinged pulley assembly,
wherein the first lifting cable is configured to raise the deck when the pulley assembly connected to the winch cable is moved in a first direction,
wherein the first lifting cable is configured to lower the deck when the pulley assembly connected to the winch cable is moved in a second direction, opposite the first direction, and
wherein the first lift arm and the first swing arm are located outboard of the deck.

2. The trailer system of claim 1, wherein the angled portion of the deck is angled less than or equal to four degrees below a plane formed by the level portion of the deck.

3. The trailer system of claim 1, wherein the first lift arm does not extend beyond a front end or a rear end of the deck when the deck is in a lowered position or when the deck is in a raised position.

4. The trailer system of claim 3, wherein the first swing arm is shorter in length than the first lift arm.

5. The trailer system of claim 4, wherein the first swing arm is connected to a leaf spring, and wherein the leaf spring is further connected to the first lift arm.

6. The trailer system of claim 1, further comprising: a remote control configured to control the winch.

7. The trailer system of claim 1, wherein the first inboard stub axle and the first outboard stub axle are substantially coplanar.

8. The trailer system of claim 1, further comprising: an equipment enclosure connected to the chassis, wherein the winch is mounted within the equipment enclosure.

9. The trailer system of claim 8, wherein the equipment enclosure further comprises:
a solar panel located on a surface of the equipment enclosure;
a battery located within the equipment enclosure; and
a charging circuit located within the equipment enclosure and electrically connected between the solar panel and the battery.

10. The trailer system of claim 1, further comprising:
a second lifting cable connected to the pulley assembly;
a second axle beam connected to the deck and further connected to a second axle hub;
a third hinged pulley assembly; and
a second lifting assembly, comprising:
a second swing arm connected to a second outboard stub axle and further connected to a second inboard stub axle, the second inboard stub axle being further connected to the second axle hub; and
a second lift arm connected to the second swing arm by a second hinge, the second lift arm comprising a fourth hinged pulley assembly attached to the second lift arm,
wherein a first end of the second lifting cable is connected to the second hinged pulley assembly.

11. The trailer system of claim 10, further comprising: a second mount beam connected to the deck and further connected to the third hinged pulley assembly.

12. The trailer system of claim 11, further comprising a second fixed pulley assembly connected to the second mount beam, wherein the second lifting cable passes through the second fixed pulley assembly and the second hinged pulley assembly.

13. A trailer system, comprising:
a chassis;
a deck connected to the chassis, the deck comprising a level portion and an angled portion;
an equipment enclosure connected to the chassis;
a winch mounted within the equipment enclosure and connected to a winch cable;
a solar panel located on a surface of the equipment enclosure;
a battery located within the equipment enclosure;
a charging circuit located within the equipment enclosure and electrically connected between the solar panel and the battery;
a pulley assembly connected to the winch cable and further connected to a first lifting cable;
a first axle beam connected to the deck and further connected to a first axle hub;
a first lifting assembly, comprising:
a first hinged pulley assembly;
a first swing arm connected to a first outboard stub axle and further connected to a first inboard stub axle, the first inboard stub axle being further connected to the first axle hub; and
a first lift arm connected to the first swing arm by a first hinge, the first lift arm comprising a second hinged pulley assembly connected to the first lift arm,
wherein a first end of the first lifting cable is connected to the first hinged pulley assembly, wherein the first lifting cable is configured to raise the deck when the pulley assembly connected to the winch cable is moved in a first direction, and wherein the first lifting cable is configured to lower the deck when the pulley assembly connected to the winch cable is moved in a second direction, opposite the first direction.

14. The trailer system of claim 13, further comprising: a first mount beam connected to the deck and further connected to the first hinged pulley assembly.

15. The trailer system of claim 14, further comprising: a first fixed pulley assembly connected to the first mount beam, wherein the first lifting cable passes through the first fixed pulley assembly and the first hinged pulley assembly.

16. The trailer system of claim 15, wherein the first lift arm and the first swing arm are located outboard of the deck.

17. The trailer system of claim 16, wherein the first lift arm does not extend beyond a front end or a rear end of the deck when the deck is in a lowered position or when the deck is in a raised position.

18. The trailer system of claim 17, wherein the first swing arm is shorter in length than the first lift arm.

19. The trailer system of claim 18, wherein the first swing arm is connected to a leaf spring, and wherein the leaf spring is further connected to the first lift arm.

20. The trailer system of claim 13, wherein the first inboard stub axle and the first outboard stub axle are substantially coplanar.

* * * * *

(12) EX PARTE REEXAMINATION CERTIFICATE (12498th)
United States Patent
Reid (10) Number: US 10,369,917 C1
(45) Certificate Issued: Jan. 31, 2024

(54) TRAILER

(71) Applicant: Reid Inventions Limited, Auckland (NZ)

(72) Inventor: Glen Reid, Auckland (NZ)

(73) Assignee: FUTURA IP LIMITED, Auckland (NZ)

Reexamination Request:
No. 90/015,240, May 26, 2023

Reexamination Certificate for:
Patent No.: 10,369,917
Issued: Aug. 6, 2019
Appl. No.: 15/418,358
Filed: Jan. 27, 2017

(51) Int. Cl.
*B60P 1/08* (2006.01)
*B60P 1/02* (2006.01)
*B60P 1/14* (2006.01)
*B62D 63/06* (2006.01)
*B62D 63/08* (2006.01)
*H02J 7/35* (2006.01)

(52) U.S. Cl.
CPC ............ *B60P 1/08* (2013.01); *B60P 1/025* (2013.01); *B60P 1/14* (2013.01); *B62D 63/061* (2013.01); *B62D 63/08* (2013.01); *H02J 7/35* (2013.01)

(58) Field of Classification Search
CPC .... B60P 1/08; B60P 1/025; B60P 1/14; B62D 63/061; B62D 63/08; H02J 7/35; H02J 2310/40
See application file for complete search history.

(56) References Cited

To view the complete listing of prior art documents cited during the proceeding for Reexamination Control Number 90/015,240, please refer to the USPTO's Patent Electronic System.

*Primary Examiner* — Terrence R Till (57) ABSTRACT

Improved trailers are disclosed having a lowering system comprising lift arms and swing arms that are operable via a plurality of cables and which allow the improved trailers to be oriented in a raised or lowered position.

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-8 and 10-12 is confirmed.

Claims 9 and 13-20 were not reexamined.

\* \* \* \* \*